United States Patent
Noldus

(10) Patent No.: US 11,283,773 B2
(45) Date of Patent: Mar. 22, 2022

(54) PROTECTING USER'S ANONYMITY WHEN VISITING FOREIGN NETWORKS

(71) Applicant: Telefonaktiebolaget LM Ericsson (publ), Stockholm (SE)

(72) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 136 days.

(21) Appl. No.: 16/343,066

(22) PCT Filed: Nov. 16, 2016

(86) PCT No.: PCT/EP2016/077839
§ 371 (c)(1),
(2) Date: Apr. 18, 2019

(87) PCT Pub. No.: WO2018/091076
PCT Pub. Date: May 24, 2018

(65) Prior Publication Data
US 2019/0288988 A1    Sep. 19, 2019

(51) Int. Cl.
*H04L 29/06* (2006.01)
*H04W 12/02* (2009.01)
(Continued)

(52) U.S. Cl.
CPC ...... *H04L 63/0421* (2013.01); *H04L 65/1046* (2013.01); *H04L 65/1069* (2013.01);
(Continued)

(58) Field of Classification Search
CPC .......... H04L 63/0414; H04L 63/0421; H04W 12/00518
See application file for complete search history.

(56) References Cited

U.S. PATENT DOCUMENTS

| 7,912,452 B2* | 3/2011 | Zhu | H04L 63/08 455/411 |
| 2007/0260739 A1* | 11/2007 | Buckley | H04L 61/3085 709/230 |

(Continued)

FOREIGN PATENT DOCUMENTS

| EP | 1594270 A1 * | 11/2005 | .......... H04L 63/0421 |
| EP | 1594270 A1 | 11/2005 | |
| KR | 20160106119 A * | 9/2016 | .......... H04L 65/1016 |

OTHER PUBLICATIONS

3GPP, "3rd Generation Partnership Project; Technical Specification Group Services and System Aspects; Generic Authentication Architecture (GAA); Generic Bootstrapping Architecture (GBA) (Release 13)", TS 33.220 V13.1.0, Jun. 2016, pp. 1-93. (Year: 2016).*

(Continued)

*Primary Examiner* — Michael Pyzocha
(74) *Attorney, Agent, or Firm* — Murphy, Bilak & Homiller, PLLC

(57) ABSTRACT

There are provided mechanisms for registering and subsequently communicating with classified subscribers in an IMS environment. The method comprises replacing an IMS Public -and Private User identity (IMPU/IMPI) with randomized temporary identifiers. Parties, in particular parties with 5 access to network entities outside the home-network cannot relate the observed IMPU/IMPI to the subscriber's original IMPU/IMPI as provisioned, and as the temporary IMPU changes frequently, there is no pattern (registration nor call) to be allocated to the subscriber's UE.

19 Claims, 11 Drawing Sheets

(51) Int. Cl.
  *H04L 65/1069*  (2022.01)
  *H04L 65/1046*  (2022.01)
  *H04L 65/1073*  (2022.01)
  *H04L 65/1016*  (2022.01)
(52) U.S. Cl.
  CPC ......... *H04L 65/1073* (2013.01); *H04W 12/02*
        (2013.01); *H04L 65/1016* (2013.01)

(56) References Cited

U.S. PATENT DOCUMENTS

| | | | | |
|---|---|---|---|---|
| 2010/0199330 | A1* | 8/2010 | Schott | H04L 65/1073 726/4 |
| 2010/0232422 | A1* | 9/2010 | Blanco | H04L 65/1073 370/352 |
| 2010/0290403 | A1* | 11/2010 | Lindholm | H04L 65/1069 370/328 |
| 2010/0290456 | A1* | 11/2010 | Mutikainen | H04L 67/14 370/352 |
| 2011/0124339 | A1* | 5/2011 | Alriksson | H04L 61/2084 455/435.1 |
| 2011/0126017 | A1* | 5/2011 | Blom | H04L 63/06 713/171 |
| 2011/0159861 | A1* | 6/2011 | Pratt | H04L 63/0407 455/417 |
| 2011/0194459 | A1* | 8/2011 | Belinchon Vergara | H04L 61/3095 370/254 |
| 2011/0238845 | A1* | 9/2011 | Keller | H04L 65/1016 709/227 |
| 2012/0203879 | A1* | 8/2012 | Merino Vazquez | H04L 65/1069 709/223 |
| 2012/0302233 | A1* | 11/2012 | Moermans | H04L 67/306 455/432.3 |
| 2012/0317250 | A1* | 12/2012 | Fine | H04L 65/1016 709/220 |
| 2014/0133399 | A1* | 5/2014 | Kim | H04W 76/11 370/328 |
| 2015/0103776 | A1* | 4/2015 | Luther | H04L 61/2038 370/329 |
| 2015/0120947 | A1* | 4/2015 | Guo | H04L 67/143 709/228 |
| 2015/0172269 | A1* | 6/2015 | Cha | H04L 63/205 726/5 |
| 2015/0208450 | A1* | 7/2015 | Mademann | H04L 65/1006 370/329 |
| 2015/0264634 | A1* | 9/2015 | Ding | H04W 4/70 455/434 |
| 2016/0323325 | A1* | 11/2016 | Nie | H04W 12/06 |
| 2016/0374044 | A1* | 12/2016 | Li | H04L 65/1016 |
| 2019/0007376 | A1* | 1/2019 | Norrman | H04W 8/26 |

OTHER PUBLICATIONS

Rajavelsam, R., "Efficient Security Mechanism for Broadcasting over IMS Networks", 2010 IEEE 4th International Conference on Internet Multimedia Services Architecture and Application (IMSAA), Dec. 2010, pp. 1-6. (Year: 2010).*

3GPP, "3rd Generation Partnership Project; Technical Specification Group Core Network and Terminals; Signalling flows for the IP multimedia call control based on Session Initiation Protocol (SIP) and Session Description Protocol (SDP); Stage 3 (Release 5)", TS 24.228 V5.15.0, Sep. 2006, pp. 1-851. (Year: 2006).*

3GPP, "3rd Generation Partnership Project; Technical Specification Group Core Network and Terminals; UICC-terminal interface; Physical and logical characteristics (Release 13)", TS 31.101 V13.2.0, Jun. 2016, pp. 1-35. (Year: 2016).*

Peterson, J., "A Privacy Mechanism for the Session Initiation Protocol (SIP)", Request for Comments: 3323, Nov. 2002, pp. 1-22. (Year: 2002).*

3GPP, "3rd Generation Partnership Project; Technical Specification Group Core Network and Terminals; Signalling flows for the IP multimedia call control based on Session Initiation Protocol (SIP) and Session Description Protocol (SDP); Stage 3 (Release 5)", TS 24.228 V5.15.0, Sep. 2006, pp. 1-851.

3GPP, "3rd Generation Partnership Project; Technical Specification Group Core Network and Terminals; UICC-terminal interface; Physical and logical characteristics (Release 13)", TS 31.101 V13.2.0, Jun. 2016, pp. 1-35.

Peterson, J., "A Privacy Mechanism for the Session Initiation Protocol (SIP)", Request for Comments: 3323, Nov. 2002, pp. 1-22.

3GPP, "3rd Generation Partnership Project; Technical Specification Group Services and System Aspects; Generic Authentication Architecture (GAA); Generic Bootstrapping Architecture (GBA) (Release 13)", TS 33.220 V13.1.0, Jun. 2016, pp. 1-93.

Rajavelsam, R., "Efficient Security Mechanism for Broadcasting over IMS Networks", 2010 IEEE 4th International Conference on Internet Multimedia Services Architecture and Application (IMSAA), Dec. 2010, pp. 1-6.

* cited by examiner

PROTECTING USER'S ANONYMITY WHEN VISITING FOREIGN NETWORKS

TECHNICAL FIELD

Embodiments presented herein relate to a method, a system, system entities, a computer program, and a computer program product for a classified IMS subscriber in an IMS environment for initializing a secure communication session in an IMS network.

BACKGROUND

In communications networks, there can be a challenge to provide a certain level of anonymity for a subscriber to register and initialize a call for a given communications network type and protocol, in which the communications network is deployed.

Anonymity may be achieved by so called "classified" communication. Classified is a term that is used to identify communication to or from designated subscribers within the security industry, including defence forces, police forces, high-ranked government staff etc. There is a demand for communication systems that provide a high degree of security in that the anonymity of a person or subscriber that is calling (or called) is assured. The Internet Protocol (IP) Multimedia Subsystem (IMS) is generally considered to be the preferred architecture for subscriber-to-subscriber and subscriber-to-system multimedia communication, including communication between classified subscribers.

Communication network providers, are generally regarded as trusted, in particular with respect to calls handled completely within their own network. However when a mobile subscriber, with a subscription to its network provider, operating the network of the network provider, in its so called "home-network", roams to a network of another mobile network provider, called the "visited-network", there can be no full control of the call signalling by the home-network provider, but control has to rely on trust relationship between the operators.

There may be cases envisaged wherein trust between the operators is not sufficient to guarantee a subscriber that his/her call has the same level of anonymity, comparable to a call handled completely within the subscriber's home-network.

In an IMS communication network, Session Initiation Protocol (SIP) signalling messages are provided with an identifier, having a correlation with the subscriber. Signalling messages are required e.g. to setup a call or query an Application Server (AS). An identifier is applied in the signalling messages to identify the subscriber, and is called "IMS Public User Identity" (IMPU). The term IMPU is standardized. As the name implies, an IMPU is an identifier associated with the identity of a subscriber. An IMS subscriber is provisioned with one or more IMPU's.

An example of an IMS network wherein signalling messages with identifiers are applied to have a User Equipment (UE) registered, is presented in 3GPP TS 24.228 "Signalling flows for the IP multimedia call control based on SIP and Session Description Protocol (SDP).

According to Internet Engineering Taskforce Request for Comments IETF RFC 3323, IMS networks provide SIP signalling wherein a privacy indication is sent along with a SIP message comprising the withholding of the identity of a subscriber (and related personal or private information) from one or more subscribers in an exchange of communications, specifically a SIP dialog. However, this privacy option does not secure the caller's IMPU from being visible during registration and traffic phase to the IMS network of the visited operator.

The IMPU is required for registering the IMS subscribers, for enabling the entities involved in establishing a connection and setting up a call, and to recognize the signalling messages as belonging to a particular subscriber. IMPUs regarding a particular subscriber, are sent over the IMS networks while all traffic to and from a particular subscriber should be associated with the particular subscriber. The IMPU's handled by a visited-network, are detectable by the visited-network and therefore a call, when routed via the visited-network, might amount to a potential breach of anonymity. Hence, there is a need for an improved handling of secure registration and call setup in an IMS network.

SUMMARY

An object of embodiments herein is to provide a secure registration method and system wherein the identity of a subscriber is hidden when registering to the home network. It is another object to provide a secure method and system wherein the identity of a subscriber is hidden when initializing a call setup.

According to a first aspect there is presented a method for initializing a secure communication session in an Internet Protocol Multimedia Subsystem (IMS) network. The network comprises a Home Subscriber Server (HSS) and a User Equipment (UE) communicatively connected to each other. The method comprises the HSS to receive provisioning data comprising a first identifier that is associated with the UE. The method further comprises the UE initializing a Generic Bootstrapping Architecture (GBA) session with the HSS via a secure link wherein the UE requests for a second identifier. The method still further comprises the HSS in response to the request of the UE for the second identifier, with generating the second identifier and as well a third identifier. The HSS provides the second identifier to the UE via the secure link. The three identifiers are associated with each other, while the first identifier is different from the second and third identifier. The method still further comprises that the UE registers in the IMS network, while applying the second identifier as the UE's identifier for registration into the IMS network. The method still further comprising that the HSS receives a query from a Serving Call Session Control Function (S-CSCF), that is also comprised by the network. The S-CSCF initializes the query comprising the second identifier, where the HSS in response to the query that comprises the second identifier, replies with providing the third identifier, which can be used by the UE during traffic.

According to a second aspect there is presented a method for initializing a secure communication session in IMS network, wherein the network comprises a HSS and where the HSS receives provisioning data that associated with a UE, and where the provisioning data comprising a first identifier. The HSS further receives a request for a second identifier from the UE that associated with the first identifier as provisioned. The HSS further generates in response to the request, the requested second identifier and as well a third identifier. The second identifier is provided by the HSS to the UE. All three identifiers are associated with each other, and the first identifier is different from the second and third identifier. The HSS also receives a query of a IMS network entity, where the query comprises the second identifier. In response to the query, the HSS provides the third identifier via the IMS network entity into the direction of the UE.

According to a third aspect there is presented a method for initializing a secure communication session in IMS network, where the method comprises that the request from the UE is received via a secure link. On the secure link a Generic Bootstrapping Architecture (GBA) protocol is applied.

According to a fourth aspect there is presented a method for initializing a secure communication session in IMS network, where the second and third identifiers are generated randomly in a Universal Resource Identifier format. The second identifier will be different from the third identifier.

According to a fifth aspect there is presented a method for initializing a secure communication session in IMS network where the first identifier is an IMS Public User Identity as provisioned to the HSS. The second identifier is a Registration IMPU as provisioned in the HSS, and the third identifier is a Traffic IMPU.

According to a sixth aspect there is presented a method for initializing a secure communication session in IMS network where the Registration IMPU and the Traffic IMPU identifiers are temporary and will be renewed periodically.

According to a seventh aspect there is presented a method for initializing a secure communication session in IMS network wherein the HSS provides the generated Traffic IMPU identifier, along with the associated IMPU identifier that is provided in the HSS, to a network entity. The identifiers are provided along with a timestamp comprising date & time when the Traffic IMPU identifier was assigned to the UE.

According to an eighth aspect there is presented a method for initializing a secure communication session in IMS network. The network comprises a UE and a HSS. A first identifier that represents the UE is provisioned to the HSS. The UE initializes a request for a second identifier to the HSS, and the UE receives a second identifier from the HSS. The second identifier that is received, is different from the first identifier that was provisioned. The UE further registers in the IMS network, while applying the second identifier as the UE's identifier for a registration. The UE receives a third identifier from the IMS network, where this third identifier is different from the first identifier as provisioned in the HSS. The third identifier is designated to be used for a subsequent call setup.

According to an ninth aspect there is presented a method for initializing a secure communication session in IMS network, where the UE initializes the request and receives the second identifier via a secure link according. The link applies a Generic Bootstrapping Architecture (GBA) protocol.

According to an tenth aspect there is presented a method for initializing a secure communication session in IMS network, where the first identifier is an IMS Public User Identity (IMPU) as provisioned to the HSS. The second identifier is a Registration IMPU, and the third identifier is a Traffic IMPU.

According to an eleventh aspect there is presented a method for initializing a secure communication session in IMS network, where the Registration IMPU and the traffic IMPU are temporary and will be renewed periodically.

According to an twelfth aspect there is presented a HSS for initializing a secure communication session for a UE in an IMS network, wherein both the HSS and the UE are comprised by the network. The HSS has a processing circuitry that is configured to cause the HSS, to perform the method of the second aspect.

According to an thirteenth aspect there is presented a HSS for initializing a secure communication session for a UE in an IMS network, that has processing circuitry is further configured to cause the HSS to store the generated second and third identifier in storage medium entity. The circuitry is further enable to cause the HSS to provide the generated third identifier and the first identifier, along with a timestamp comprising date & time when the third identifier was assigned to the UE, to a log entity.

According to an fourteenth aspect there is presented a UE enabled for initializing a secure communication session in an IMS network, wherein both the UE and the HSS are comprised by the network. The identity of the UE is identified by a first identifier stored in the HSS, and wherein the UE comprises a processing circuitry that is configured to cause the UE to perform the method of the eighth aspect.

According to an fifteenth aspect there is presented a UE enabled for initializing a secure communication session in an IMS network, wherein the UE comprises a processing circuitry that is configured to cause the UE to control input means to enable a selection between classified mode and non-classified mode by means of input-means.

According to an sixteenth aspect there is presented computer program for initializing a secure communication session in an IMS network. The computer program comprising computer code which, when run on processing circuitry of a HSS causes the HSS to perform the method of the second aspect.

According to an seventeenth aspect there is presented a computer program for initializing a secure communication session for a UE in an IMS network. The computer program comprising computer code which, when run on processing circuitry of a UE causes the UE to perform the method of the eighth aspect.

According to an eighteenth aspect there is presented a computer program product comprising a computer program according to at least one of the second, the eights, the sixteenth and seventeenth aspects, and a computer readable storage medium on which the computer program is stored. The computer readable storage medium could be a cloud based or non-transitory computer readable storage medium.

According to an nineteenth aspect there is presented a HSS for initializing a secure communication session for a UE in an IMS network, where the HSS has a module that is configured to store a Primary IMS Public User Identity (IMPU). The primary IMPU is the identifier identifying the UE in a storage module, where the primary IMPU is provisioned in the HSS. The HSS comprises a receive GBA (Generic Bootstrapping Architecture) module, that is configured to receive a request from the UE for a Registration IMPU. The HSS further comprises a generate and store module, that is configured to generate a Registration IMPU and a Traffic IMPU identifier. The generate and store module is arranged to store these Registration and Traffic IMPU identifiers along with an association with the first identifier, i.e. the Primary IMPU in a storage module. The HSS further comprises a provide module, that is configured to provide the Primary IMPU and the Traffic IMPU to a log entity.

According to an twentieth aspect there is presented a HSS for initializing a secure communication session for a UE in an IMS network, according to the nineteenth aspect, wherein the HSS further comprises a receive query module that is configured to receive a query from an IMS entity for a Subscription information from the HSS. The HSS further comprises a retrieve a Traffic IMPU module, that is configured to retrieve a traffic IMPU, that is associated with a given Registration IMPU. Both the Traffic IMPU and the Registration IMPU have been generated by the generate and store module. The HSS further comprises a provide Traffic IMPU module, that is configured to provide the Traffic IMPU to the IMS entity that initialized the query.

According to an twenty-first aspect there is presented a HSS for initializing a secure communication session for a UE in an IMS network according to the nineteenth aspect, wherein the HSS further comprises a resolve request module, that is configured to resolve a request, wherein a Traffic IMPU should be resolved into a Primary IMPU, as previously provisioned in the HSS. The HSS further comprises a request allowed check module, that is configured to check whether the requester is allowed to be answered with a resolved Primary IMPU. The HSS still further comprises a select and provide a Primary IMPU module. This module is configured to select the Primary IMPU that is associated with the given Traffic IMPU. The selected Primary IMPU is provided to the requesting entity.

According to an twenty-second aspect there is presented a UE for initializing a secure communication session by the UE in an IMS network, where the IMS network also comprises a HSS. The UE comprises a classified operation check module, that is configured to check whether the UE is able and allowed to operate in a classified mode. The UE further comprises a block IMSI initialization module, that is configured to block the IMSI application to generate an IMPU, if the UE is operating in classified mode. The UE still further comprises an initialize https request with GBA module, that is configured to initialize a link with the HSS of the home-operator of the UE.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments are shown. These embodiments are provided by way of example so that this disclosure will be thorough and complete. Like numbers refer to like elements throughout the description.

Figure 1:
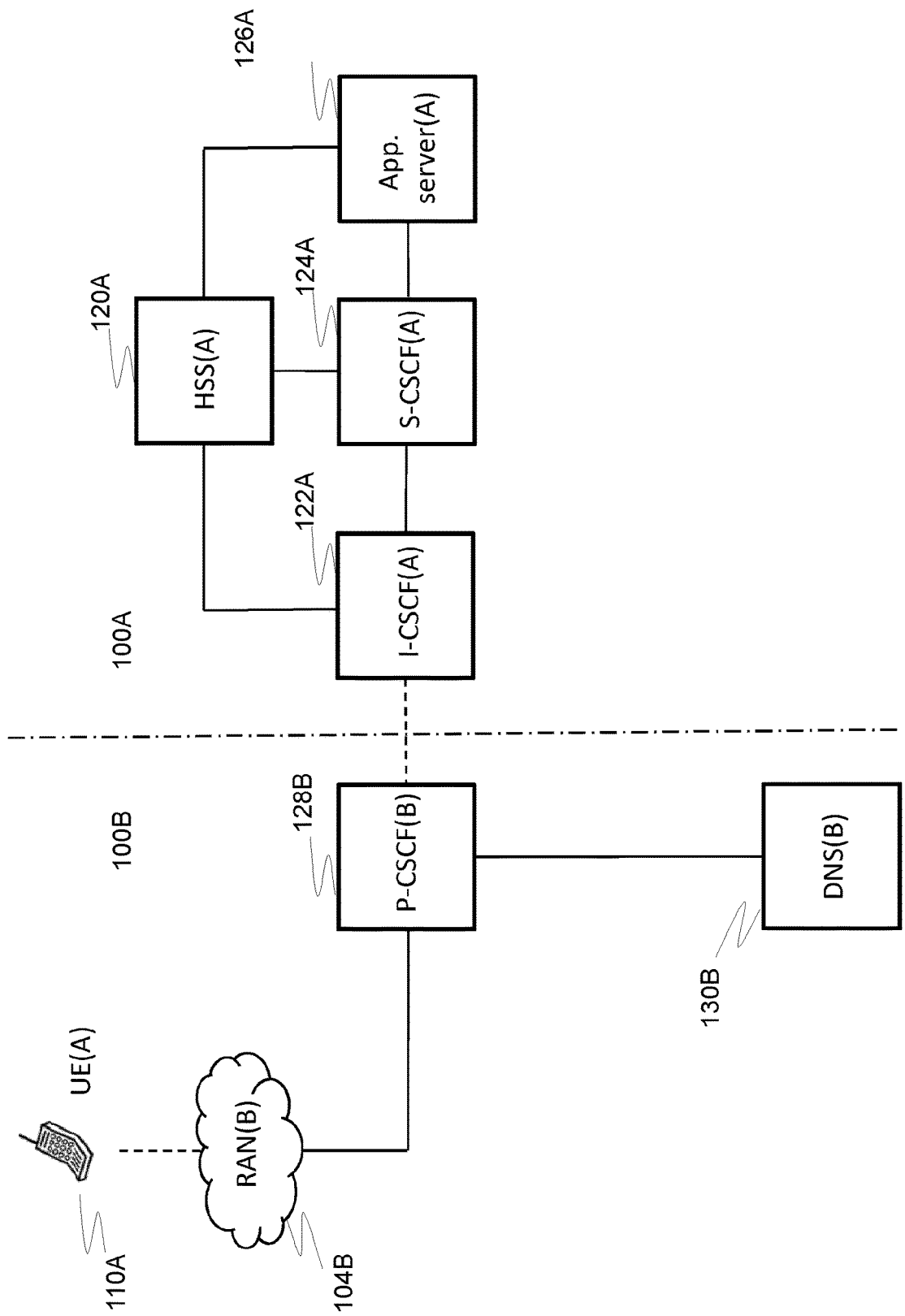
FIG. 1 is a schematic diagram illustrating an IMS network according to embodiments.

FIG. 1 is a schematic block diagram illustrating an Internet Protocol (IP) Multimedia Subsystem (IMS) network wherein a subscriber, applying a User Equipment A (UE(A)) 110A, is enabled to register the UE(A) and eventually to make a call. The term IMS network is regarded to comprise both first network 100A and second network 100B. For the ease of explanation an entity belonging to a particular network, is presented with a suffix between brackets, e.g. UE(A), denoting a User Equipment belonging to the network 100A. The term e.g. UE(A,B) us to be understood as comprising the User Equipment belonging to network 100A or 100B. A UE belong to a particular network if it is provisioned in that network.

The subscriber has its subscriber data and its UE(A) 110A provisioned to a first network 100A, in the perspective of UE(A) called the home-network. In a particular scenario as presented the UE(A) is located physically in a second network 100B, in the perspective of UE(A) called the visited-network, being different from the home-network 100A.

FIG. 1 does only present the entities belonging or relating to an IMS network that supports the explanation of the proposed idea. E.g. the visited-network 100B which generally has the same entities as the home-network 100A, only shows a limited number, but relevant, entities.

UE(A) 110A, currently located in visited-network 100B is serviced by a Radio Access Network (RAN(B)) 104B, which is connected to a Proxy Call Session Control Function (P-CSCF(B)) 128B, which is connected to a Domain Name Server (DNS(B)) 130B, for resolving a Universal Resource Locator (URL) into an IP address.

There is a communicative connection between the P-CSCF(B) 128B of the visited-network 100B and an entity in the home-network 100A, called the Interrogating Call Session Control Function A (I-CSCF(A)) 122A, thereby noting that gateways and other intermediate entities between both networks 100A and 100B are omitted for the ease of explanation.

Home-network 100A is depicted next to said I-CSCF(A) 122A, with a Home Subscriber Server A (HSS(A)) 120A that maintains subscriber data including one or more IMPUs for each subscriber, a Serving Call Session Control Function A (S-CSCF(A)) 124A, enabled to control the registration and calls of the UE(A) 110A, and as an example an Application Server A 126A, like a 3GPP Multi Media Telephony Application Server (MMTel-AS).

The presented entities in the networks are connected to each other according to predefined links, each having a reference point name, and deploying specific protocols.

An IMPU conforms with the structure of a Universal Resource Identifier (URI). Examples of an IMPU may look like:

---
sip:john.smith@company.com
tel:+31163279911
sip:+31163279911@company .com

---

The IMPU forms part of a subscriber profile provisioned and maintained in the HSS(A). When an IMS subscriber registers to the communication network, or in other words: creates a binding to a S-CSCF(A), the IMS subscriber provides at least one IMPU to the IMS-network. By providing one or more IMPUs during provisioning before a first use, or a subsequent provisioning of additional IMPUs, a subscriber may indicate which IMPU should be applied, e.g.

related to the use of a certain device (e.g. mobile-phone, lap-top computer, tablet computer).

The IMS network provides the feature to apply different IMPUs during registration and traffic. A traffic phase initializes when the registration phase has ended.

The subscriber is identified through the IMPU. Within the context of secure communication, it is not desirable when the IMS operator of visited-network 110B has full knowledge by means of its P-CSCF(B) 128B of the traffic activity of a classified subscriber's UE(A) 110A. In fact, it would even be preferred when the P-CSCF(B) 128B has no knowledge at all about the User or subscriber identity of UE(A) 110A, in particular of the subscriber's IMPU. The IMPU of the subscriber is a persistent subscription element. With respect to IMPUs that are registered in IMS, all traffic to or from the subscriber can be related to the IMPU. The visited-network could 'track' certain IMPU's, as to determine a certain 'pattern' in communication activity associated with the particular IMPU. Knowing a particular pattern or a change in pattern of calling, how frequent a subscriber is calling or how long a conversation lasts, might be valuable information in the perspective of classified subscribers.

The idea proposed, applies an IMPU, that should be associated to a subscriber, wherein this IMPU as provisioned in the HSS(A), will be designated as "Primary IMPU" in this description as to distinguish with other IMPUs. This Primary IMPU cannot be changed by the subscriber and wherein this Primary IMPU is in general not revealed on request to entities outside the home-network, unless extensive checks proof the validity of the request. The Primary IMPU will not be used as a Registration IMPU nor as a Traffic IMPU. Additionally, a Primary IMPI is associated with a subscriber. The Primary IMPI is applied during registration only, but this Primary IMPI is also not revealed outside the home-network analogous with the Primary IMPU.

When a UE(A) 110A is located in the IMS visited-network 100B, and is registering to the IMS home-network, an IMPU has to be sent by IMS convention to the IMS entities S-CSCF(A) 124A, and Application Server (AS) A or SIP-AS(A) 126A by the HSS(A) 120A. The UE(A) 110A will apply the Registration IMPU in SIP signalling for establishing an IMS communication service. More specifically: the Registration IMPU is included in the SIP signalling from the UE(A), such as a SIP REGISTER INVITE request, for establishing a voice call.

A prior art "from header" in a SIP REGISTER message comprises the Registration IMPU and may look like:
 From: "John Smith"<sip:john.smith@company.com>; tag=a3452326b
However, as is shown from this example, the SIP "from header", the Registration IMPU applied reveals who is the registering subscriber. By having the HSS(A) 120A providing a randomized IMPU to the UE(A), the SIP REGISTER "from header" may look like:
 From: "aaa.bbbb"<sip:aaa.bbbb@cdefgab.efg>; tag=a3452326b
The "from header" as such still complies with IMS conventions and is understood by the IMS nodes as having a valid format, although not to be mapped to a subscriber or particular UE without additional knowledge.

Next to the IMPU identifier, IMS has defined IMS Private User Identity (IMPI) identifier, which will be used for registration only. The IMPI together with the IMPU identifies a service profile of the subscriber and also determines what authentication should be used for the registration. The IMPI has, just as an IMPU, in the prior art the form of a Universal Resource Identifier (URI) as shown in an example below:
 john.smith@company.com
During registration the IMPI will be handled the same way as the IMPU. This description will focus on the handling of the IMPU, as the IMPU is also applied during a traffic phase, which is one of the main goals to secure a classified subscriber both during registration phase and a following traffic phase.

The idea presented is proposed to apply randomized IMPUs, still conforming substantially with the IMS conventional operation, wherein measures have been taken to recognize SIP headers to be belong to a specific subscriber's UE(A).

Figure 2:
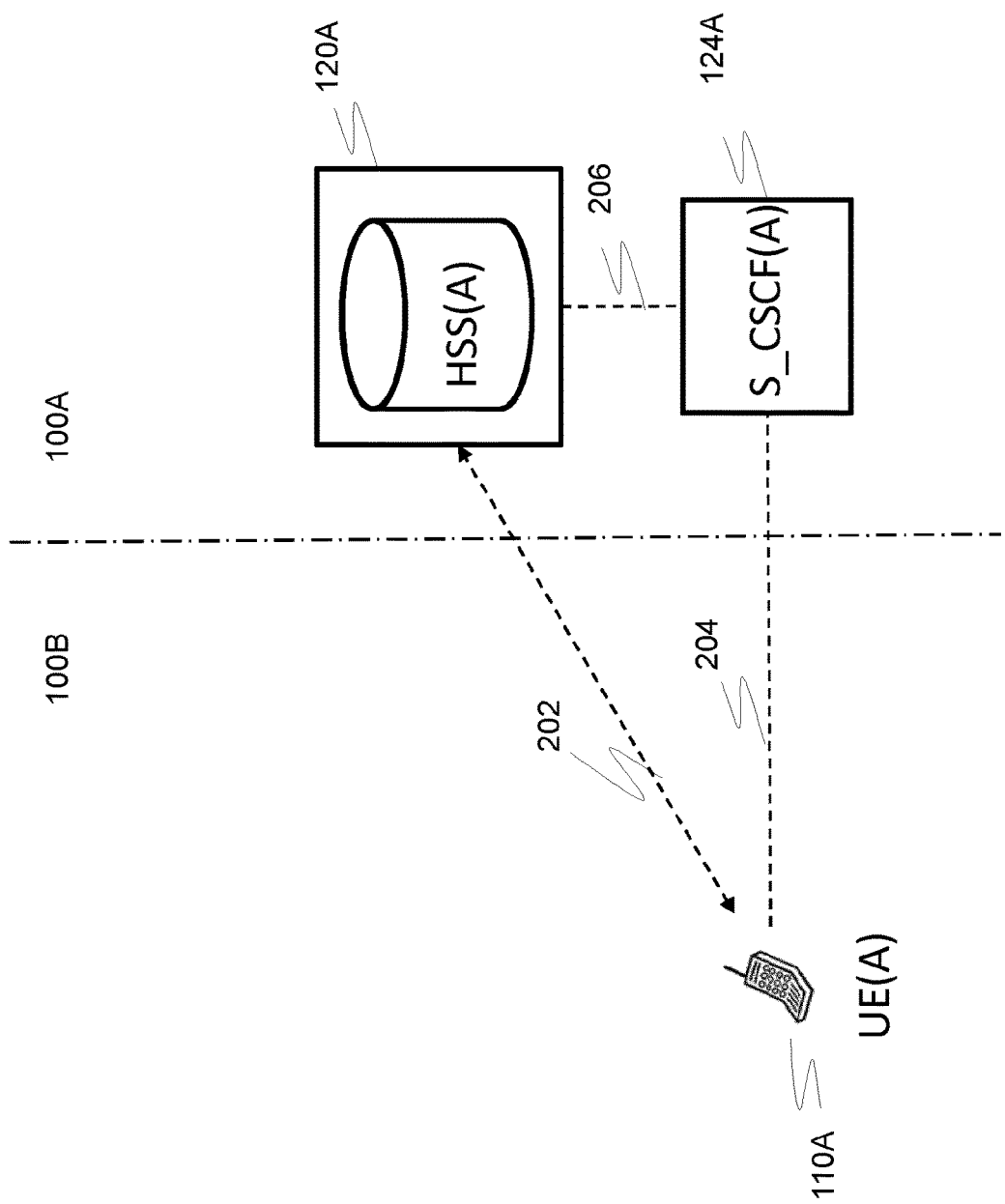
FIG. 2 is a schematic diagram of indicating signalling in an IMS according to embodiments.

FIG. 2 is a schematic diagram wherein a registration according to the proposed idea is presented. The method proposed is based on:

The HSS(A) 120A of the operator of the IMS home-network 100A, in perspective of UE(A), comprises a Primary IMPU of the subscriber. This Primary IMPU of the subscriber is the a regular IMS public identifier of the subscriber which is under normal, non-classified, conditions, used to identify the calling or the called subscriber. However this Primary IMPU identifier will not be revealed to the visited-network 100B, in the perspective of UE(A). It is this identifier that is desired to hide in the IMS network.

Each time a classified subscriber's UE(A) 110A performs initial IMS registration or performs periodic IMS registration, the subscriber's UE(A) 110A an IMPU, called an Registration IMPU while this IMPU is meant to be used for registration purposes only, obtains a Registration IMPU from the HSS 120A, which it will then use in the registration procedure. The HSS(A) 120A generates and provides a unique set of Registration IMPUs as well as Registration IMPIs, for the registration process for the UE 110A, for a single (or periodic) IMS registration process.

The set of Registration IMPU and Registration IMPI are Temporary, and hence not used more than once, wherein both the Registration IMPU and the Registration IMPI are unique.

In FIG. 2, both the home-network 100A and the visited-network 100B are depicted. UE(A) 110A, being provisioned in the HSS(A) 120A of the home-network needs to register with its home-network 100A, according to the convention within IMS networks.

As a precondition it must be arranged that UE 110A has Internet connectivity, e.g. by means of a Wireless LAN or an IP carrier access network, such as RAN(B) 104B.

The method proposed presents that UE 110A initializes a secure https link towards HSS(A) 120A via a Generic Bootstrapping Architecture (GBA) protocol according to 3GPP TS 33.220. GBA is a technology that enables the authentication of a subscriber that has been provisioned in the HSS(A). By means of a challenge/response of a shared secret, one in the Universal Integrated Circuit Card (UICC) in the UE(A) and an associated secret in the HSS(A) the subscriber authentication is performed, providing a secure association which is limited in time. Following a GBA sequence a secure tunnelled https link with the HSS(A) is setup wherein a Registration IMPU is provided by the HSS(A) 120A via link 202 (representing public Internet) towards UE(A) 110A.

The HSS(A) 120A also provides the home-network S-CSCF(A) 124A with the Registration IMPU via link 206, as to enable the S-CSCF(A) 124A to support in completing the registration sequence of UE(A). The UE(A) initiates a registration sequence via link 204 with its SIP REGISTRATION "from header" comprising the just received Registration IMPU. On reception of the SIP REGISTRATION message from the UE(A) the S_CSCF(A) queries the HSS (A) 120A for the service profile belonging to the Registration IMPU in the "From Header)".

Additionally the HSS will also provide a Traffic IMPU, associated with the Primary IMPU, where after the S-CFCS sends the Traffic IMPU to the UE(A). When the UE(A) initiates a call setup, this Traffic IMPU will be used according to IMS conventions. The Traffic IMPU is used for a single (or periodic) IMS registration process, and hence not used more than one, as such the Traffic IMPU is a Temporary identifier.

Figure 3:
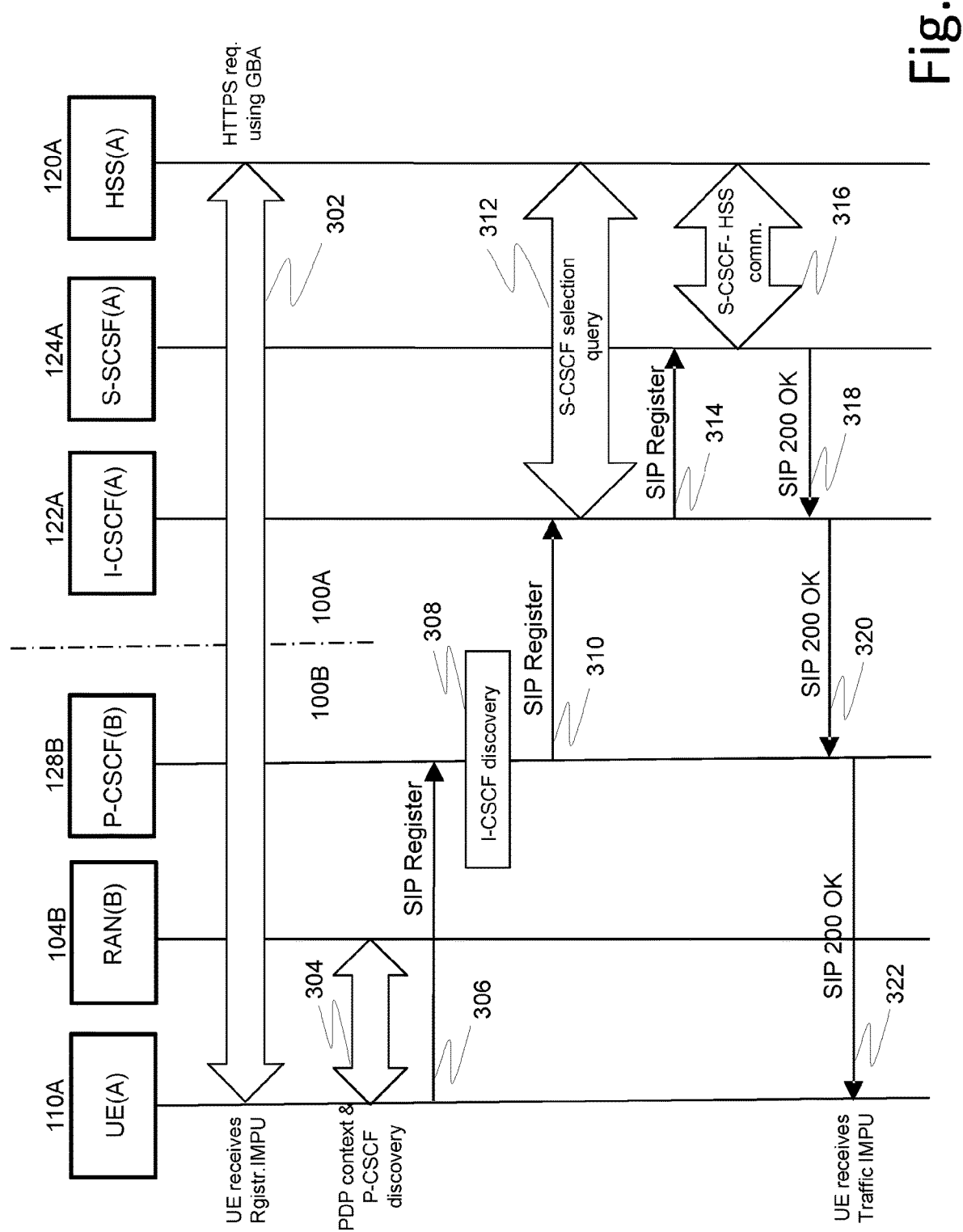
FIG. 3 is a signalling diagram illustrating an IMS network signal flow according to embodiments.

FIG. 3 is a signalling diagram wherein a registration according to the proposed idea is presented schematically. FIG. 3 presents in larger detail, and sequentially the steps of FIG. 2.

The method proposed presents that UE(A) 110A arranges Internet connectivity e.g. via a LAN or Mobile Network Access RAN(B) 104B, and initializes 302 a secure https link towards HSS(A) 120A via a Generic Bootstrapping Architecture (GBA) according to 3GPP TS 33.220. The UE(A) 110A receives a Registration IMPU (and Registration IMPI) via the initialized secure link. The Home operator URL, or Home IMS realm, e.g. "ims_operator.com", is stored on the IMS Subscriber Identification Module (ISIM), which is an application, residing on the UICC being the smart card used in mobile terminals as specified in 3GPP TS 31.101. The IMPU is stored on the ISIM and is not to be used, and should there for be blocked when GBA is applied.

The IP address of P-CSCF(B) 128B may be provided 304 by e.g. RAN(B) 104B or obtained from a Dynamic Host Configuration Protocol (DHCP) server (not shown) in the IMS visited-network 100B. In accordance with the IMS paradigm, the UE 110A registers 306 through a P-CSCF(B) 128B. The P-CSCF(B) 128B may be comprised by, or integrated with a Session Border Gateway (SBG) entity. The UE 110A constructs a SIP REGISTER message, wherein the "to" and "from" headers are configured from the Registration IMPU, earlier received from the HSS(A) 120 during the GBA session 302. The prepared SIP REGISTER message destined for the P-CSCF(B) 128B comprises as an example among others:

---
REGISTER sip:ims_operator.com SIP/2.0
To:"aaa.bbbb"<sip: aaa.bbbb@cdefgab.efg > ;tag=a3452326b
From:"aaa.bbbb"<sip: aaa.bbbb@cdefgab.efg > ;tag=a3452326b

---

The P-CSCF(B) 128B asserts the Registration IMPU (i.e. User Identity aaa.bbbb@cdefgab.efg) from the SIP REGISTER message "from header", and copies it to the P-Asserted-Id (PAI) header. The P-CSCF(B) 128B is aware of the SIP signalling activity of the subscriber's UE(A) 110A, albeit in relation to the Registration IMPU, thereby not pointing to the Primary IMPU to be hidden, and stored in HSS(A) 120A.

The P-CSCF may be located in a foreign IMS network; this is the case when the IMS subscriber is roaming and Local BreakOut (LBO) is used. LBO is used for, among others, Voice over Long term Evolution (VoLTE) access networks. When the subscriber has registered in the IMS network, the P-CSCF (in foreign IMS network) receives and stores subscriber information. The method of the present idea ensures that the subscriber's IMPU does not form part of the subscriber information that is sent to the P-CSCF.

Based on the header "REGISTER sip:ims_operator.com SIP/2.0" in the SIP REGISTER message, the P-CSCF(B) 128B is enabled via DNS server 130B to query a lookup for the IP address of the I-CSCF(A) 122A. The P-CSCF(B) 128B includes a Path header to the SIP REGISTER message (=host name of this P-CSCF 128(B)) where messages destined for the UE(A) are to be routed back via this P-CSCF (B). With the IP-address of the I-CSCF(A) resolved, the SIP-REGISTER message is transferred.

The I-CSCF(A) contacts 312 the HSS(A) 120A, where the I-CSCF has to define the appropriate S-CSCF which may handle the registration and any subsequent call setup. Therefore the I-CSCF(A) queries the HSS(A) as to select the HSS for investigating the required profile and capabilities required by the UE(A) associated with the Registration IMPU. The HSS(A) replies with the S-CSCF(A) 122A address, such that the I-CSCF(A) is enabled to forward 314 the SIP REGISTER message to the S-CSCF(A).

In case the subscriber's UE(A), associated with the Registration IMPU is not known to the HSS(A) 120A, the I-CSCF sends unsuccessful final response on the SIP REGISTER Request.

Triggered by the SIP REGISTER message 314, the S-CSCF(A) 124A initialized 316 a communication session with the HSS(A) for retrieving the User profile, Initial Filter Criteria (IFC) for the UE(A) 110A by providing the Registration IMPU and IMPI to the HSS(A). Additionally the HSS(A) communicates the Traffic IMPU to the S-CSCF(A).

A sequence of SIP 200 OK messages is provided 318, 320, 322 toward the UE(A) 110A, for indicating a successful registration, and also comprising the Traffic IMPU. The Traffic IMPU is to be applied by UE(A) 110A for the duration that this subscriber is registered, being a period or phase between a successful registration and a de-registration. A re-registration, either being forced after a pre-configured period when idle, or when a new call setup is requested, also invokes Traffic IMPU. For each SIP INVITE and Re-REGISTER from the UE(A), the S-CSCF(A) queries the HSS(A) for a new Traffic IMPU, which will be used for a new communication session. The Traffic IMPU is hence used during a single IMS registration period only and regarded a temporary Traffic IMPU.

The proposed registration also supports third party registration, such as registration in Service Centralization and Continuity Application Server (SCC-AS) and Multi Media Telephony Application server (MMTel-AS) 126A. This registration is, likewise, performed with the Traffic IMPU. The S-CSCF(A) 124A has received the IMS user profile associated with the subscriber associated with the Traffic IMPU, including Initial Filter Criteria (IFC). The IFC contains Service Point Triggers (SPT), pointing to SCC-AS and/or MMTel-AS. The S-CSCF(A) hence sends a third party Register request to SCC-AS and/or MMTel-AS, as appropriate. This third party Register request contains the Traffic IMPU, as was sent 318, 320, 322 during the registration phase from the S-CSCF(A) to UE(A). The SCC-AS and/or MMTel-AS use(s) the Traffic IMPU to obtain service subscription data from the HSS(A). The HSS(A) had allocated this Traffic IMPU and it has a record to associate the Traffic IMPU with the corresponding subscriber via the Primary IMPU. The HSS(A) hence responds to the SCC-AS and/or MMTel-AS with the subscriber's MMTel subscription data. The SCC-AS/MMTel-AS now has service subscription data available needed for handling MMTel communication services, without having received the subscriber's Primary IMPU/IMPI.

During the periodic re-registration process, the HSS(A) 120A allocates a new Traffic IMPU for the subscriber's UE and provides this new Traffic IMPU to the UE(A) in the 200 OK message. The UE(A) discards the Traffic IMPU it had previously received and starts using the new Traffic IMPU for establishing communication sessions. The S-CSCF(A), likewise, receives the new Traffic IMPU and shortly thereafter (configurable period) discards the previously received Traffic IMPU. The SCC-AS/MMTel-AS, which receive the third party Register request in this process, will also shortly discard the previously received Traffic IMPU and will keep the newly received Traffic IMPU on record. Both the S-CSCF(A) and SCC-AS/MMTel-AS retain the previously received Traffic IMPU for a designated (short, configurable) period, in order to be able to process any traffic establishment request based on the previously allocated (i.e. old) Traffic IMPU.

Although the location of the UE(A) is depicted in a non-home-network or visited-network 100B, requiring the procedures as described as to achieve a secure environment for a classified subscriber, the same solution might be applied of the registration (and subsequent call) is completely performed in the home-network, from the perspective of the UE(A).

Figure 4:
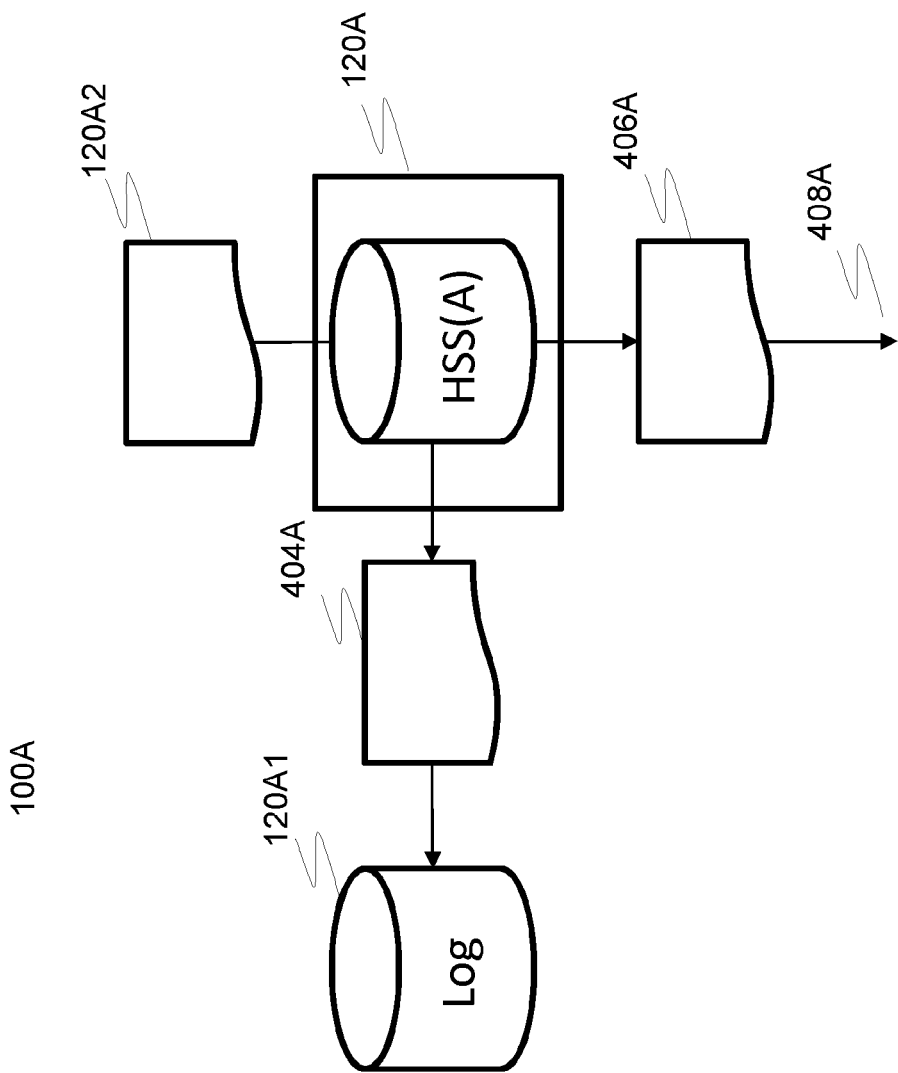
FIG. 4 is a schematic diagram of indicating signalling in an IMS according to embodiments.

FIG. 4 is a schematic diagram wherein the operation of the HSS 120A is explained in detail.

The Home Subscriber Server A (HSS(A)) 120A, or User Profile Server Function (UPSF), is a database that supports IMS network entities that enable other nodes in the IMS network to execute calls. The HSS comprises subscription information, called "subscriber profiles", and perform authentication and authorization of the subscriber's UE(A). Additionally the capabilities of the S-CSCF(A) are known by the HSS(A).

When there are multiple HSSs present in an operator's network a Subscriber Location Function (SLF, not shown) is required to select the HSS(A) which holds the subscriber's data, as a subscriber is provisioned to only one HSS(A)

According to the proposed idea, the HSS(A) 120A is, besides storing subscriber information, arranged to randomly generate Registration IMPUs, Traffic IMPUs and Registration IMPIs.

An example of a subscriber record 120A2 in the HSS(A) 120A may comprise:
Primary IMPU
Primary IMPI
Registration IMPU
Registration IMPI
Traffic IMPU The values stored in the Registration IMPU, the Registration IMPI and the Traffic IMPU do have a temporary character while the values stored in the Primary IMPU, the Primary IMPI do have a permanent character.

Each time a new Registration—IMPU or IMPU or Traffic IMPU identifier is generated, the old identifier will be kept present for a configurable period in the HSS(A), as processes that are related to the old identifier might not have ended yet.

In communication networks, costs for communication sessions are in many cases based on post-payment, wherein Call Detail Records (CDRs) are generated to enable billing systems to process costs for a subscriber. For classified subscribers there is provided a method to enable a billing system to allocate the randomized Traffic IMPUs with the actual subscriber.

A log entity 120A1 is provided for storing and maintaining a record 404A holding a Primary IMPU in combination with one or more associated Traffic IMPUs. The log entity 120A1 might be located in the HSS(A) 120A or externally with appropriate security measures.

The S-CSCF(A) and MMTel-AS 126A, and other system components in the IMS network, generate charging records as normal. Charging records contain P-asserted-Id and Request Universal Resource Identifier (R-URI) as normal, reflecting a calling subscriber and a called subscriber respectively. The PAI and the R-URI in the Diameter records will contain the respective Traffic IMPU, since those are the IMPUs through which UE(A) and UE(B) are registered in the IMS network. For the IMS network, the Traffic IMPUs are regular identities. It is transparent for the IMS core network, including the systems that process the charging records, which subscribers have communication sessions.

The HSS(A) keeps a log, with time stamps, of the allocated Traffic IMPUs allocated to a subscriber. Off-line, it can be determined by authorized charging record processing system which subscriber is associated with a particular Traffic IMPU at a particular moment. Said log that is generated by the HSS(A) and stored in the log entity 120A1, shall be provided, in secure manner, to an authorized billing or charging record processing system only. That means that regular network operators are not authorized to read or retrieve this log file from HSS(A). In this manner, only authorized operation staff can determine which classified subscribers have communication sessions.

Traffic IMPUs, assigned to a particular UE(A), reflecting the Traffic IMPU and the associated Primary IMPU are store together with a timestamp comprising date & time when the Traffic IMPU was assigned to the UE(A). This log file constitutes the Primary IMPU correlation and reflects for all classified subscribers, which Traffic IMPU is allocated to a particular subscriber at any moment.

A request to resolve a link between an observed traffic IMPU with a Primary IMPU may also be requested by other systems than billing systems, such as authorized intelligence system or analysis equipment.

Records 406A of the randomly generated Registration IMPUs, the Traffic IMPUs and the Registration IMPIs are provided 408A by the HSS(A) to particular entities as the UE(A) 110A and the S-CSCF(A) 124A. The Registration IMPU and IMPI are provided 408A to the UE(A) in communication session 302 via a HTTPS link, applying the GBA protocol. The Traffic IMPU is provided 408A to the S-CSCF(A) 124A in communication session 316.

Only when the HSS(A) is requested by UE(A) by means of the GBA procedure to provide the Registration IMPU and IMPI, the HSS will generate and provide the requested Registration IMPU & IMPI and Traffic IMPU. Besides the log entity 120A1 will be provided with the record 404A. If the subscriber's UE(A) operates in a non-classified mode, a registration will be by convention performed via the P-CSCF(B) with the IMPU provided by the UE(A)'s ISIM application.

Figure 5:
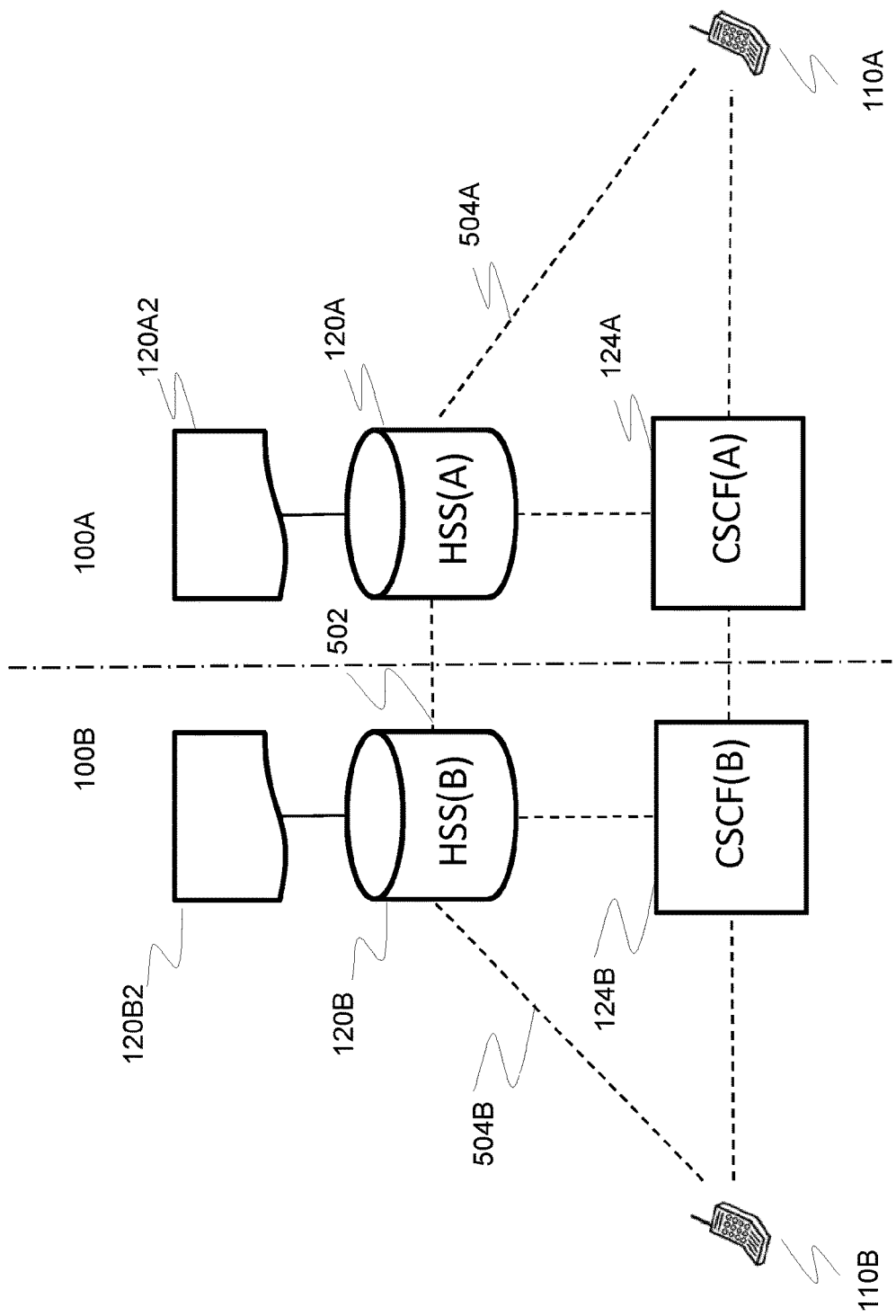
FIG. 5 is a schematic diagram of indicating an IMS network according to embodiments.

FIG. 5 is a block diagram wherein both a called- and calling subscriber are classified subscribers having a UEs 110A, 110B that are located in their home-networks first network 100A and second network 100B respectively. As a precondition both the calling and called subscribers are assumed to have been registered in their respective HSSs, according to the process depicted above for UE(A) 110A.

As such both UE(A) and UE(B) are in the possession of a Traffic IMPU, and the HSS(A) 120A and HSS(B) 1206 have the respective Traffic IMPUs in their subscriber records 120A2 and 120B2.

In so far as the identity of a classified destination subscriber is concerned, a similar randomness is applied compared to a situation wherein the calling subscriber UE(A) 110A is located in the visited-network 1006 presented above. The UE(A) 110A, now in its home-network, needs to requests the its HSS(A), through HTTPS, a Traffic IMPU of the destination subscriber's UE(B) and uses that Traffic IMPU to establish the call. This identifier is ad hoc and is at this moment assigned to the destination subscriber's UE(B), facilitating that this IMPU identifier can be used for communication establishment.

A requirement for establishing secure communication between the subscriber of UE(A) and the subscriber of UE(B) is that both subscribers have established each a secure connection to their respective HSS, through GBA via links 504A and 5046 respectively. This implies, among others, that both subscribers may belong to the same operator. HSS(A) should be able to provide to the UE(A), when the subscriber of UE(A) wishes to establish secure communication with the subscriber of UE(B), the Traffic IMPU currently assigned to the subscriber of UE(B).

When the calling subscriber of UE(A) intends to establish a communication session to the subscriber of UE(B), the UE(A) applies a secure https link (GBA based) 504A with its HSS(A) 120A to obtain the currently allocated Traffic IMPU for the UE(B) to be called. The subscriber's UE(A) does not know the Traffic IMPU of UE(B), but does know the Primary IMPU of UE(B), which may not be revealed to the network components like CSCF(A) 124A (or 1246 when the call is made by the UE(B) towards UE(A)) of its home-network.

The process for UE(A) in the HSS(A) that is accessed through the secure https link 504A uses HSS-internal signalling via link 502 to obtain the Traffic IMPU identifier for the subscriber of UE(B).

HSS(A) represents the HSS that comprises the subscriber record of UE(A), including the Traffic IMPU(A); HSS(B) represents the HSS that comprises the subscriber record of the UE(B), including the Traffic IMPU(B). HSS(A) and HSS(B) may be one and the same HSS, e.g. in the case of UE(A) and UE(B) having the same operator. The HSS(B) retrieves the current Traffic IMPU of the UE(B). This Traffic IMPU is provided via link 502, HSS(A), link 504A towards UE(A).

Subsequently UE(A) then establishes a communication session according to conventional IMS procedures i.e. sends an SIP INVITE request, whereby the P-Asserted-Id contains the Traffic IMPU for UE(A) that the UE(A) had received during the most recent registration and whereby the SIP "To header" contains the Traffic IMPU for UE(B) that HSS(B) had most recently generated and allocated for UE(B).

Since the Traffic IMPU for the UE(B) constitutes a regular IMPU (or rather: Address of Record, AoR), regular SIP session establishment applies. The SIP INVITE message is sent to the I-CSCF(B) 124B of network 100B. Diameter protocol Location-Info-Request (LIR) is used between I-CSCF(B) and HSS(B) 120B, as normal and HSS(B) informs I-CSCF(B) about the to be selected S-CSCF(B) address for UE(B). S-CSCF(B) establishes the call as normal, including invocation of MMTel-AS, based on the Traffic IMPU of UE-B. Since this Traffic IMPU of the UE-B is a valid IMPU, registered in S-CSCF(B) 124B, in MMTel-AS and in SCC-AS, the call can be established towards UE(B) 110B as normal.

The SIP INVITE request arriving at UE(B) contains the Traffic IMPU of the UE(A) 110A as PAI. This is not useful for identity presentation towards the UE(B) subscriber, or other processes in UE(B) that are based on UE(A) subscriber identity.

To mitigate this anonymity issue of an incoming call, assuming that breaking anonymity is not an issue among classified subscribers, a token is provided by the HSS(B) towards UE(A), via HSS(A), further referred to as identity token. Also the HSSs of both networks 100A, 100B must trust each other to exchange Primary IMPUs of classified subscribers. When UE(A) requests HSS(B), via HSS(A), to provide the identity token, the HSS(B) generates and allocates the identity token and provides the identity token to the UE(A), via HSS(A). The identity token is e.g. a random number. The HSS(B) keeps the identity token and stores the UE(A) Primary IMPU(A) with it. The UE(A) places this identity token in a SIP INVITE "From header" request to the UE(B). When UE(B) receives the Invite request, including the identity token, it uses the secure https link (GBA based) with the HSS(B) to resolve this identity token into a useful UE(A) identity; specifically the UE(A) identity that the UE(B) is entitled to know, namely the UE(A)'s primary IMPU. A functional connection 502 between the HSS(A) and HSS(B) is assumed here. The identity token is a "one time token".

Once the identity token is resolved by UE(B), meaning that HSS(B) has provided UE(B) with the identity of UE(A), the identity token is discarded by HSS(A).

The end result is that the communication is established between UE(A) and UE(B) without the Primary IMPU identity of the UE(A) or the Primary IMPU identity of the UE(B) being transmitted over the (public) communication channel. The only functional entity that has knowledge about the Primary IMPU (being the provisioned or "original" identity) of the UE(A) and the UE(B) is the HSS(A) and HSS(B). The Traffic IMPU of the UE(A) and the UE(B) are refreshed (replaced by a new randomly allocated Traffic IMPU) at each subsequent registration of the UE(A) or UE(B), respectively.

Figure 6:
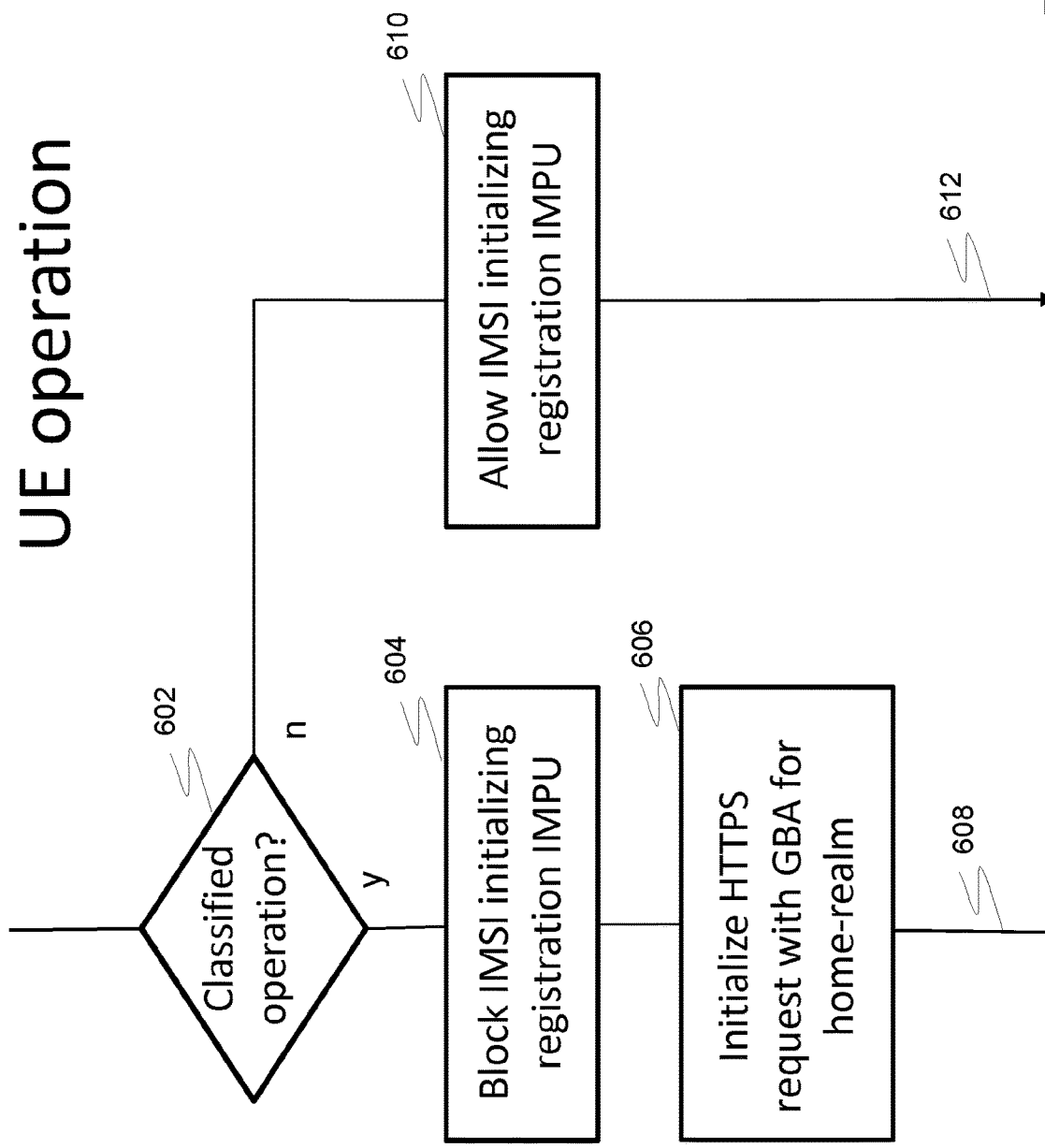
FIG. 6 is a flowchart diagram according to embodiments.

FIG. 6 is a flowchart wherein a process within the UE(A) is depicted. EU(A) 110A is adapted to apply the method proposed in that a registration by the UE(A) would either have possibility to switch between operating in a classified mode and un-classified (normal) mode, or operate in classified mode only.

In a UE(A) that is enabled to operate in classified mode only, the Operating System (OS) of the UE(A) is adapted in that the ISIM application, residing on the UICC is blocked in providing a IMPU and IMPU, and the OS is enabled to initiate a Secure link with the home HSS(A) and retrieve the Registration IMPU & IMPI by means of the GBA process for a registration to the IMS network. The adaptation of the OS might be performed by loading an OS version featuring the method proposed, or by loading and installing an application by the subscriber.

Alternatively the UE(A) has input means to enable a selection between classified mode and non-classified mode. The input-means might be manual or more advanced in that certain condition like actual position or messages received from the operator perform a switch between the modes.

In FIG. 6, a decision 602 is made whether the operation is classified or non-classified. This decision might be made at each (re)connection to a mobile operator or when a call is to be initialized. In case the operation is classified, the ISIM application of a Registration IMPU is blocked 604 and an HTTPS request is initialized 606 with GBA for the home-realm, stored on the ISIM, wherein the Registration IMPU is retrieved from the HSS(A) is performed. The retrieved Registration IMPU and IMPU are applied in the SIP REGISTER message towards the P-CSCF(B) 128B, 608.

When the operation is non-classified, the operation with the IMPU as stored in the ISIM application is allowed 610, and the IMPU retrieved by the ISIM application as specified in 3GPP TS 31.101 is applied to compose a SIP REGISTER message and send to the P-CSCF(B) 128B, 612.

Figure 7:
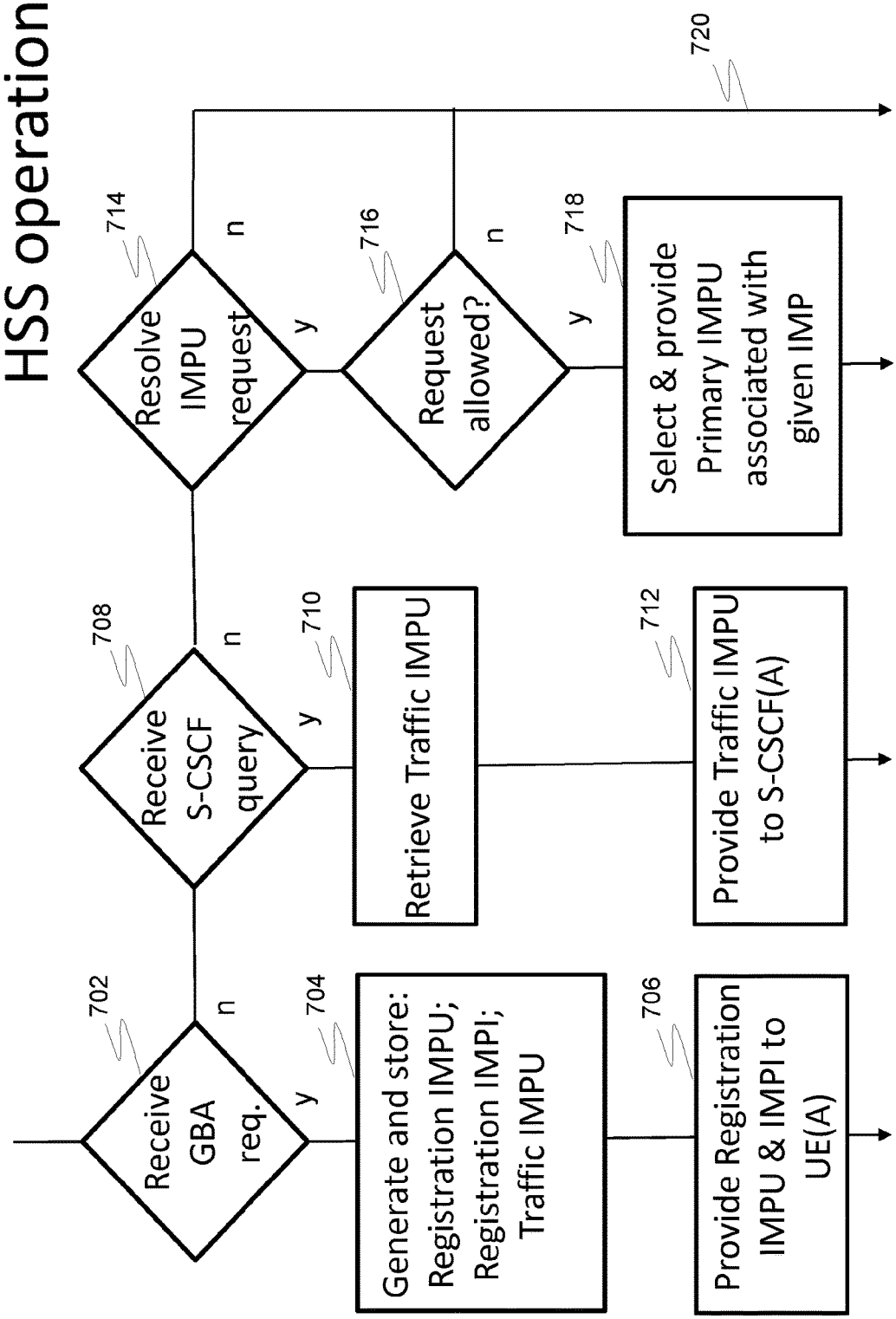
FIG. 7 is a flowchart diagram according to embodiments.

FIG. 7 is a flowchart wherein a process within the HSS(A) 120A is depicted. The HSS(A) is adapted to generate a random Registration IMPU and IMPI and to generate a random Traffic IMPU as explained at FIGS. 2 and 4.

The generation of the Registration IMPU & IMPU and the Traffic IMPU is initialized when a GBA request, initiated 302 by UE(A)s, is received 702 by HSS(A), where it will be checked that UE(A) is provisioned. Subsequently the HSS(A) generates 704 a Registration IMPU, a Registration IMPI and a Traffic IMPU identifier by means of a generator that provides randomized IMPUs and an IMPI according to URI format. These identifiers are stored 704 in the HSS(A) as a record 120A2, also comprising a Primary IMPU and a Primary IMPI identifier, such that an association between the Primary and identifiers is kept. Subsequently the Registration IMPU & IMPI are provided to the UE(A) as part of the GBA procedure.

When the HSS(A) receives 708 a Query 316 from the S-CSCF(A), as part of the UE(A) registration procedure, the HSS(A) is requested to provide the user's or subscriber's subscription data and the IFC by the S-CSCF(A), additionally the HSS(A) retrieves 710 the Traffic IMPU, generated earlier at the GBA procedure 302 of UE(A). Subsequently the retrieved Traffic IMPU is provided 712 to the S-CSCF(A), which forwards the Traffic IMPU in the direction of the UE(A).

When the HSS(A) receives 714 a request to resolve a given (Temporary) IMPU, sent e.g. by a billing system that needs to compile charging records based on a recorded session where Traffic IMPUs were applied, there will be an check 716 whether the system that is providing the request is allowed, i.e. authorized and authenticated to receive the association between a Traffic IMPU and a Primary IMPU for all, a group of, or a particular classified subscriber.

If the check yields positive, the HSS selects 718 the Primary IMPU, associated with the given (Temporary) IMPU and provides the Primary IMPU to the requesting party or entity. In case the check 716 turns out to the negative a failure request message will be provided 720 to the requesting party or entity.

Figure 8:
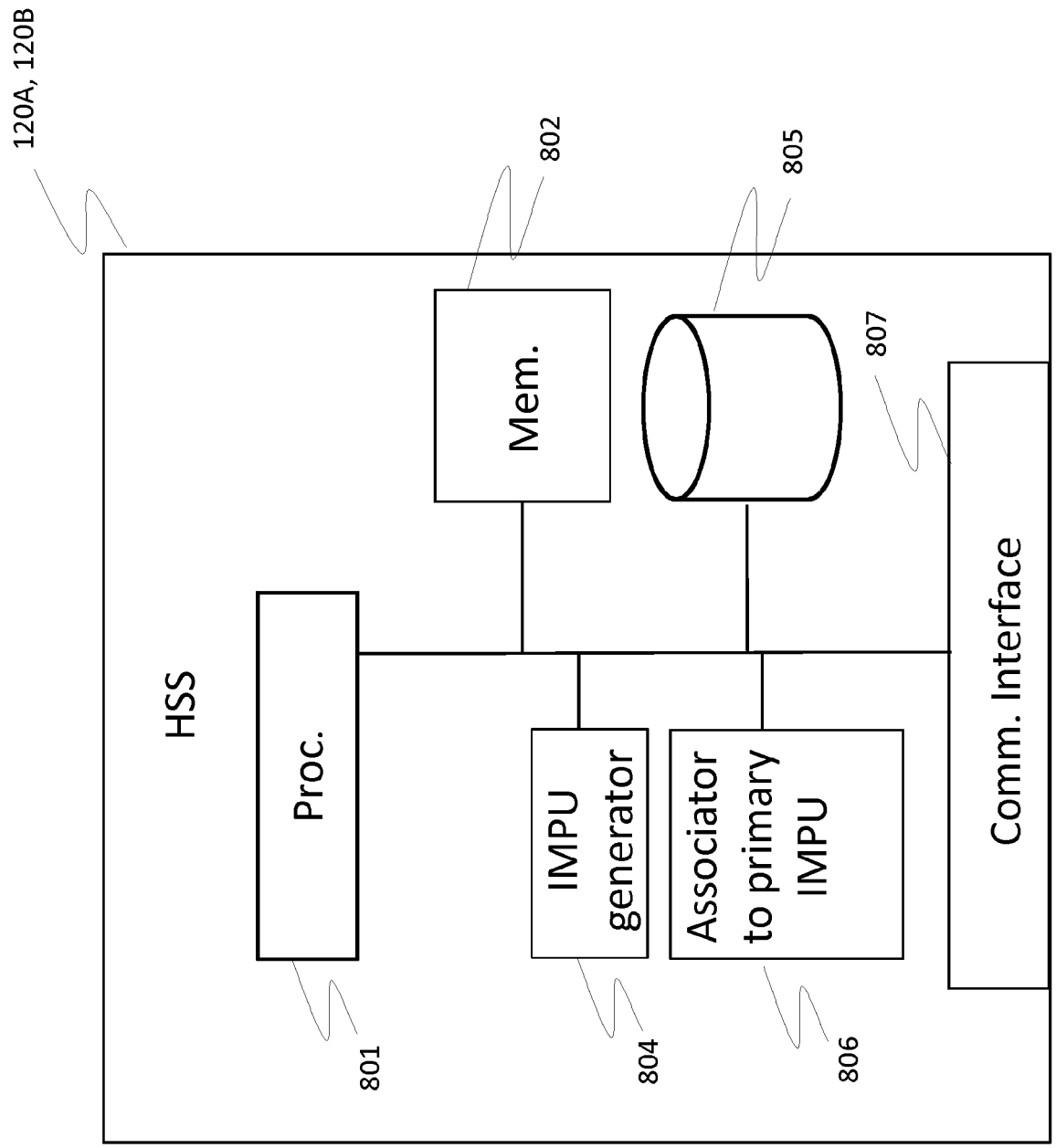
FIG. 8 is a schematic diagram showing functional units of an server entity according to an embodiment.

FIG. 8 schematically illustrates, in terms of a number of functional units, the components of a HSS(A,B) entity 120A, 120B according to an embodiment. Wherein HSS(A,B) denotes HSS(A) 120A or HSS(B) 120B. Processing circuitry 801 is provided using any combination of one or more of a suitable central processing unit (CPU), multiprocessor, microcontroller, digital signal processor (DSP), etc., capable of executing software instructions stored in a computer program product e.g. in the form of a storage medium, memory 802. The processing circuitry 801 may further be provided as at least one application specific integrated circuit (ASIC), or field programmable gate array (FPGA).

The processing circuitry 801 is configured to have the HSS(A,B) execute any of the actions 702-720, as shown in FIG. 7. For example, the storage entity 802 may store the set of operations, and the processing circuitry 801 may be configured to retrieve the set of operations from the storage medium 802 to cause the HSS(A,B) to perform a set of operations. The set of operations may be provided as a set of executable instructions. Thus the processing circuitry 801 is thereby arranged to execute methods as herein disclosed. The processing circuitry and other entities of the HSS(A,B), albeit shown here as being implemented as a physical element, might also be configured as a virtual element, such as configured in a cloud computing environment, wherein the executable elements are reserved in a software instruction environment.

The storage medium 802 may also comprise persistent storage, which, for example, can be any single one or combination of magnetic memory, optical memory, solid state memory or even remotely mounted memory.

The HSS(A,B) entity 120A, 120B may further comprise a communications interface 807 for communications at least with e.g. the Internet and the IMS network entities. As such the communications interface 807 may comprise one or more transmitters and receivers, comprising analogue and digital components.

The processing circuitry 801 controls the general operation of the HSS(A,B) entity e.g. by sending data and control signals to the communications interface 807 and the storage medium 802, by receiving data from the communications interface 807, and by retrieving data and instructions from the storage medium 802. The processing circuitry 801 controls the IMPU generator entity 804 which is configured to generate IMPUs and IMPIs in a randomized URI format, and the processing circuitry controls the entity that is arranged to associate to Primary traffic IMPUs. The processing circuitry 801 controls the storage medium entity 805 which is arranged to store and provide on retrieval bases: among others subscriber data, Primary IMPU identifiers, Primary IMPI identifiers, Registration IMPU identifiers, Registration IMPI identifiers and Traffic IMPU identifiers. Other components, as well as the related functionality, of the HSS(A,B) are omitted.

Figure 9:
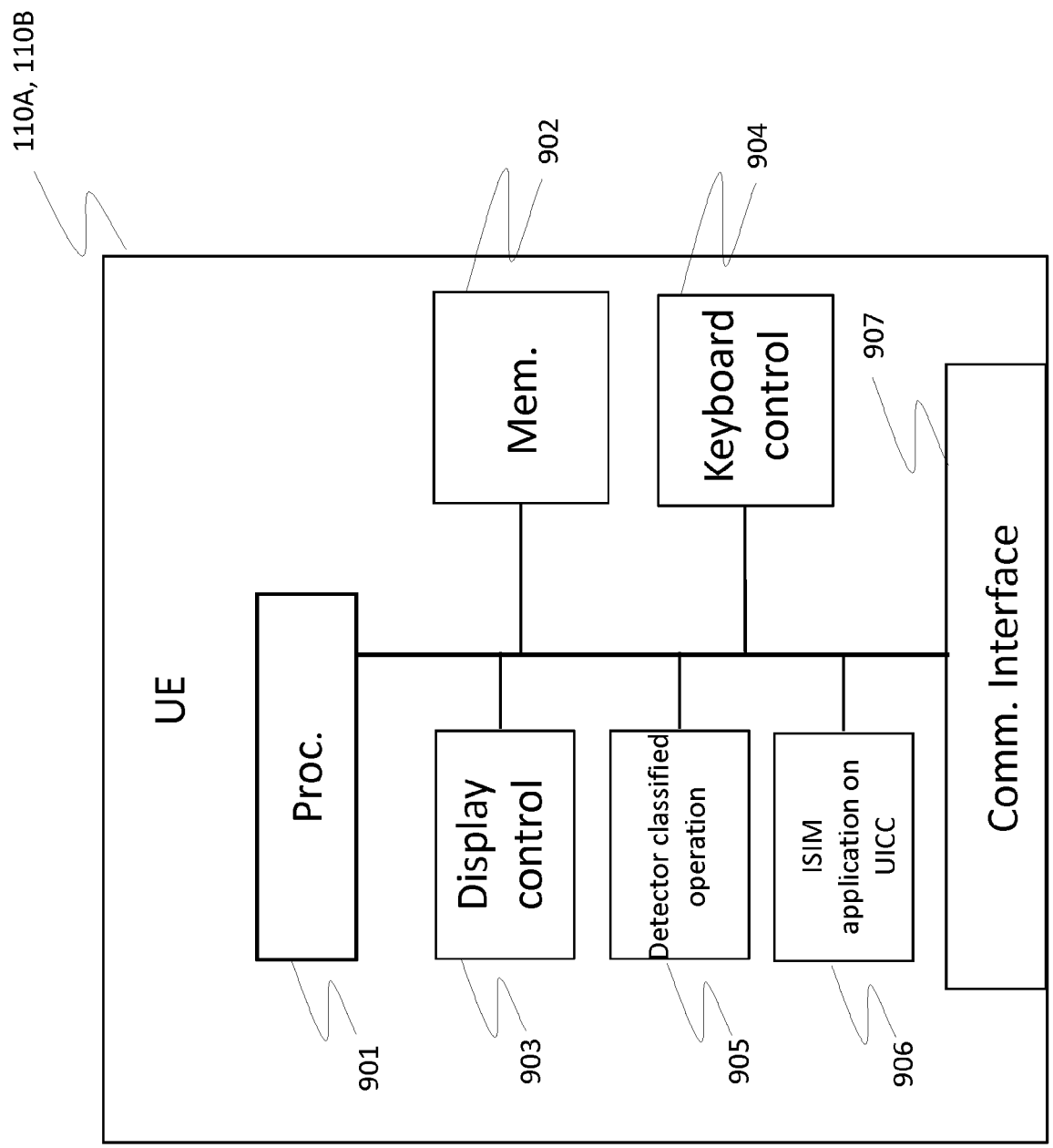
FIG. 9 is a schematic diagram showing functional units of an server entity according to an embodiment.

FIG. 9 schematically illustrates, in terms of a number of functional units, the components of a UE(A,B) 110A, 110B according to an embodiment, wherein the term UE(A,B) denotes UE(A) 110A or (UE(B) 110B. Processing circuitry 901 is provided using any combination of one or more of a suitable central processing unit (CPU), multiprocessor, microcontroller, digital signal processor (DSP), etc., capable of executing software instructions stored in a computer program product e.g. in the form of a storage medium, memory 902. The processing circuitry 901 may further be provided as at least one application specific integrated circuit (ASIC), or field programmable gate array (FPGA).

The processing circuitry 901 is configured to have the UE(A,B) execute any of the actions 602-612, as shown in FIG. 6. For example, the storage entity 902 may store the set of operations, and the processing circuitry 901 may be configured to retrieve the set of operations from the storage medium 902 to cause the UE(A,B) to perform a set of operations. The set of operations may be provided as a set of executable instructions. Thus the processing circuitry 901 is thereby arranged to execute methods as herein disclosed. The UE(A,B) may further comprise a communications interface 907 for communications at least with the IMS network entities via a Radio Access network 104B. As such the communications interface 907 may comprise one or more transmitters and receivers, comprising analogue and digital components.

The processing circuitry 910 controls the general operation of the UE(A,B), e.g. by sending data and control signals to the communications interface 907 and the storage medium 902, by receiving data from the communications interface 907, and by retrieving data and instructions from the storage medium 902. The processing circuitry 901 controls the display control 903 which display might indicate to a subscriber by means of a particular symbol whether the UE(A,B) is operating in a classified mode. The processing circuitry 901 controls the keyboard control entity 904, which might designate a particular key or key combination to switch between classified and non-classified mode. The processing circuitry 901 controls the detector for classified operation 905 whenever a certain condition is remarked where the UE(A,B) is triggered to switch to a classified mode. A condition might be a location or the reception of a particular message. The processing circuitry 901 controls the ISIM application 906 on the UICC as either to block or allow the ISIM application to provide the IMPU and IMPI as defined in the ISIM application. Other components, as well as the related functionality, of the HSS(A,B) are omitted.

Figure 10:
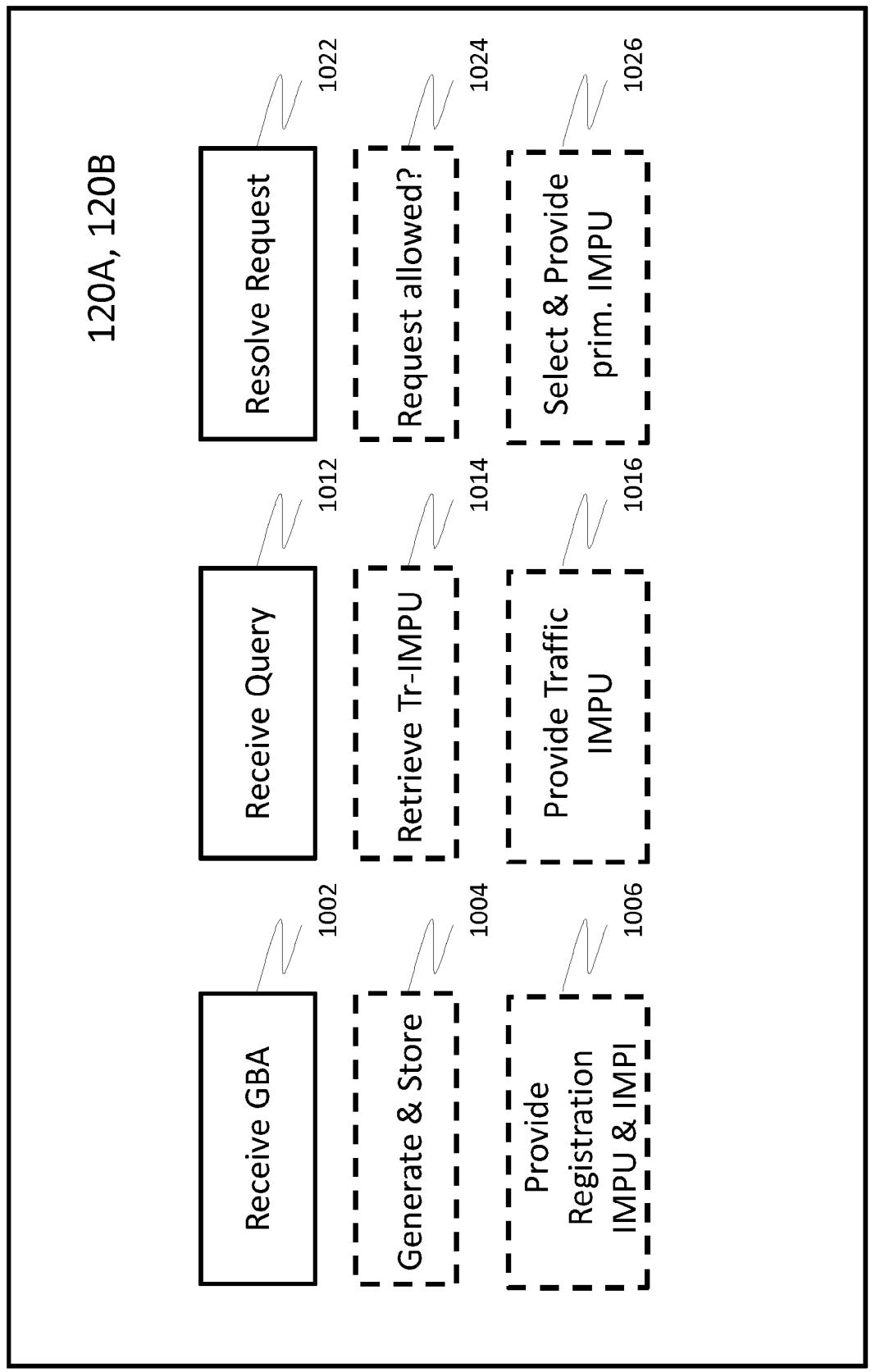
FIG. 10 is a schematic diagram showing functional modules of a server entity according to an embodiment.

FIG. 10 schematically illustrates, in terms of a number of functional modules, the components of a HSS(A,B) 120A, 120B according to an embodiment. The HSS(A,B) of this figure comprises a number of functional modules: a "Receive GBA" module 1002 is configured to perform step 702 and an optional "Generate & Store" module 1004 that is configured to perform step 704, as well as an optional "Provide" module 1006 that is configured to perform step 706.

The HSS(A,B) further comprises functional modules: Receive a query from a CSCF module 1012 is configured to perform step 708 and optional modules "Retrieve stored Traffic IMPU" module 1014 that is configured to perform step 710 and a "Provide Traffic IMPU" module 1016 that is configured to perform step 712.

The HSS(A,B) further comprises functional modules: Resolve a request module 1022 is configured to perform step 714 and optional modules "Request allowed check" module 1024 that is configured to perform step 716 and a "Select & Provide Primary IMPU module 1026 that is configured to perform step 718.

In general terms, each functional module 1002-1026 may be implemented in hardware or in software. Preferably, one or more or all functional modules 1002-1026 are implemented by the processing circuitry 801 where appropriate in cooperation with functional units 802, 804, 805, 806, 807.

The processing circuitry 801 may thus be arranged to fetch instruction from storage 802 as to operate functional modules 1002-1026 by executing these instructions, thereby performing any steps of the HSS(A,B).

Figure 11:
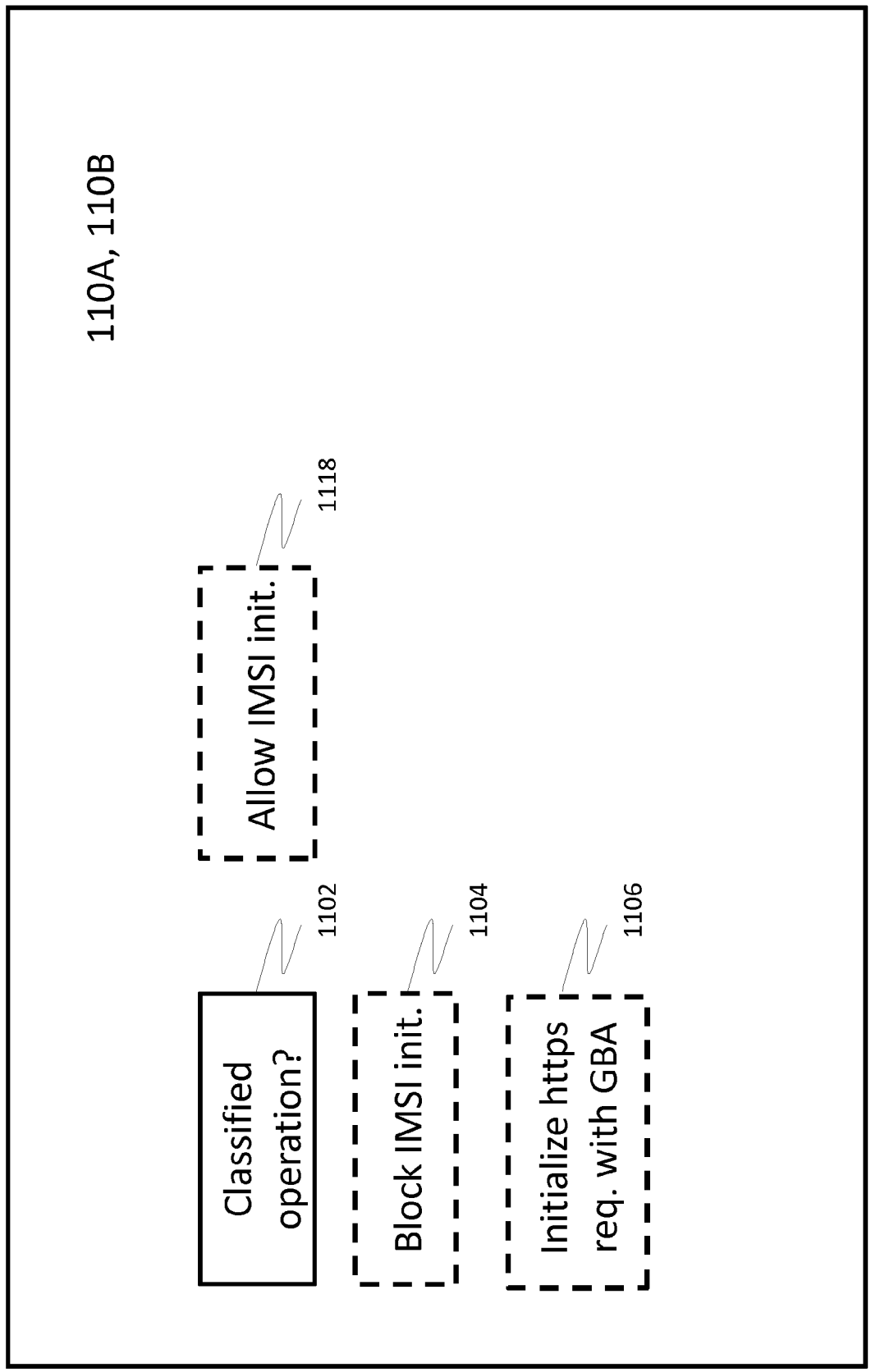
FIG. 11 is a schematic diagram showing functional modules of a User Equipment entity according to an embodiment.

FIG. 11 schematically illustrates, in terms of a number of functional modules, the components of a UE(A,B) 110A, 110B according to an embodiment. The UE(A,B) of this figure comprises a number of functional modules: A "Classified operation" check module 1102 is configured to perform step 602 and optional a "Block IMSI initialization" module 1104 that is configured to perform step 604, as well an optional "Initialize https request with GBA" 1106 that is configured to perform step 606. The UE(A,B) comprises further functional optional module "Allow IMSI initialization" module 1108 that is configured to perform step 610.

In general terms, each functional module 1102-1108 may be implemented in hardware or in software. Preferably, one or more or all functional modules 1102-1108 are implemented by the processing circuitry 901 where appropriate in cooperation with functional units 902, 903, 904, 905, 906, 907.

The processing circuitry 901 may thus be arranged to fetch instruction from storage 902 as to operate functional modules 1102-1108 by executing these instructions, thereby performing any steps of the UE(A,B).

The method provides the advantage for a classified subscriber that the visited IMS operator will not be able to reveal from a Registration IMPU/IMPI or from a Traffic IMPU which subscriber is registering in the IMS network and neither will the visited operator be able to spot a trend or communication pattern of a particular subscriber of its network.

The Method presented has the advantage that classified subscriber of an IMS network can utilize the IMS network for multimedia services, without an identity of the subscriber represented by the IMPU to be known in the network, and still apply the IMS network without major changes. Traffic activity takes place only on Traffic IMPU; the SIP signaling taking place in the network and the charging records generated by the various entities in the network contain the Traffic IMPU.

Although the method proposed is in at least one embodiments explained in a configuration wherein the P-CSCF(B) 128B of a visited-network 100B from the perspective of the UE(A) 110A, the idea could advantageously be applied as well in either home-network where all entities including the UE(A,B) 110A, 110B are located in their home-network 100A, 110B. With the increasing application of cloud computing or Software Defined Networks (SDN), it might be useful, when the home-network is substantially deployed in a cloud network, to apply the method proposed as to hide the Primary IMPU from the cloud network during a registration and a traffic phase.

The Traffic IMPU is allocated temporarily, and has limited validity (over time). This provides twofold safety: (i) the identity of the subscriber is not reflected in the SIP signaling and charging records, (ii) there is no trend to be detected, since the Traffic IMPU is regularly (synchronized with IMS registration) replaced with another Traffic IMPU. Therefor this method provides an improved level of anonymity for classified subscribers.

The inventive concept has mainly been described above with reference to a limited number of embodiments. However, as is readily appreciated by a person skilled in the art, other embodiments than the ones disclosed above are equally possible, as defined by the patent claims hereunder.

The invention claimed is:

1. A method for initializing a secure communication session in an Internet Protocol Multimedia Subsystem (IMS) network, wherein the method is performed by a Home Subscriber Server (HSS), wherein the method comprises:
   receiving provisioning data associated with a User Equipment (UE), the provisioning data comprising a first identifier;
   receiving a request for a second identifier from the UE associated with the first identifier;
   generating, in response to the request, the second identifier and a third identifier, and providing the second identifier to the UE, wherein the second identifier and the third identifier are associated with each other, wherein the first identifier is different from the second identifier and the third identifier;
   receiving a query of a Call Session Control Function (S-CSCF) comprised by the IMS network, the query comprising the second identifier, and in response to the query, providing the third identifier via the S-CSCF into the direction of the UE.

2. The method according to claim 1, wherein the request from the UE is received via a secure link according to a Generic Bootstrapping Architecture (GBA) protocol.

3. The method according to claim 1, wherein the second and third identifiers are generated random in a Universal Resource Identifier format, wherein the second identifier is different from the third identifier.

4. The method according to claim 1, wherein the first identifier is an IMS Public User Identity (IMPU) as provisioned to the HSS, the second identifier is a Registration IMPU, and the third identifier is a Traffic IMPU.

5. The method according to claim 4, wherein the Registration IMPU and the Traffic IMPU identifiers are temporary and are to be renewed periodically.

6. The method according to claim 4, further comprising providing, in response to the query, the generated Traffic IMPU, along with the associated IMPU as provisioned in the HSS, including a timestamp comprising date and time when the Traffic IMPU identifier was assigned to the UE.

7. A method for initializing a secure communication session in an Internet Protocol Multimedia Subsystem (IMS) network, wherein the method is performed by a User Equipment (UE) represented by a first identifier, wherein the first identifier is an IMS Public User Identity (IMPU), provisioned to a Home Subscriber Server (HSS), the method comprising:
  initializing a request for a second identifier, wherein the second identifier is a Registration IMPU, to the HSS;
  receiving the second identifier from the HSS, the second identifier being different from the first identifier;
  registering in the IMS network, applying the second identifier as the UE's identifier for a registration; and
  receiving a third identifier, wherein the third identifier is a Traffic IMPU, from the IMS network, the third identifier being different from the first identifier, the third identifier designated to be used for a call setup.

8. The method according to claim 7, wherein the steps of initializing the request and receiving the second identifier are performed via a secure link according to a Generic Bootstrapping Architecture (GBA) protocol.

9. The method according to claim 7, wherein the Registration IMPU and the traffic IMPU are temporary and are to be renewed periodically.

10. A Home Subscriber Server (HSS) for an initialization of a secure communication session for a User Equipment (UE) in an Internet Protocol Multimedia Subsystem (IMS) network, wherein the HSS comprises:
  processing circuitry configured to cause the HSS to:
    receive and store a provisioned first identifier that represents an identity of the UE;
    receive a request for a second identifier from the UE associated with the first identifier;
    generate and store, in response to the request, the second identifier and a third identifier, and provide the second identifier to the UE;
    receive a query of a Call Session Control Function (S-CSCF) comprised by the IMS network, wherein the query comprises the second identifier; and
    in response to the query, provide the third identifier via the S-CSCF into the direction of the UE.

11. The HSS according to claim 10, wherein the processing circuitry is further configured to cause the HSS to:
  store the generated second and third identifiers in a storage medium entity; and
  provide, to a log entity, the generated third identifier and the first identifier, along with a timestamp comprising date and time when the third identifier was assigned to the UE.

12. The HSS according to claim 10, wherein the request from the UE is received via a secure link according to a Generic Bootstrapping Architecture (GBA) protocol.

13. The HSS according to claim 10, wherein the second and third identifiers are generated random in a Universal Resource Identifier format, wherein the second identifier is different from the third identifier.

14. The HSS according to claim 10, wherein the first identifier is an IMS Public User Identity (IMPU) as provisioned to the HSS, the second identifier is a Registration IMPU, and the third identifier is a Traffic IMPU.

15. The HSS according to claim 14, wherein the processing circuitry is further configured to cause the HSS to provide, in response to the query, the generated Traffic IMPU, along with the associated IMPU as provisioned in the HSS, including a timestamp comprising date and time when the Traffic IMPU identifier was assigned to the UE.

16. The HS S according to claim 10, wherein the second identifier and the third identifier are associated with each other, wherein the first identifier is different from the second identifier and the third identifier.

17. A User Equipment (UE) configured to initialize a secure communication session in an Internet Protocol Multimedia Subsystem (IMS) network, wherein the UE comprises:
  processing circuitry configured to cause the UE to:
    initialize a link towards a Home Subscriber Server (HSS) that stores a first identifier, wherein the first identifier is an IMS Public User Identity (IMPU), by which the UE is identified and transmit a request to the HSS for a second identifier, wherein the second identifier is a Registration IMPU, in response to the request, wherein the first identity is provided along with the request;
    receive the requested second identifier from the HSS;
    register in the IMS network, using the received second identifier; and
    receive a third identifier, wherein the third identifier is a Traffic IMPU, from the IMS network, the third identifier designated to be used for a call setup.

18. The UE according to claim 17, wherein the processing circuitry is configured to cause the UE to initialize the link, transmit the request, and receive the second identifier via a secure link according to a Generic Bootstrapping Architecture (GBA) protocol.

19. The UE according to claim 17, wherein the Registration IMPU and the traffic IMPU are temporary and are to be renewed periodically.

* * * * *